United States Patent
Friebel (10) Patent No.: US 9,644,345 B2
(45) Date of Patent: May 9, 2017

(54) SYSTEM AND METHOD FOR CONTROLLING A DRIVE UNIT OF A WORK MACHINE DURING AN IDLE STATE

(71) Applicant: Deere & Company, Moline, IL (US)

(72) Inventor: Jeffrey A. Friebel, Kernersville, NC (US)

(73) Assignee: Deere & Company, Moline, IL (US)

( * ) Notice: Subject to any disclaimer, the term of this patent is extended or adjusted under 35 U.S.C. 154(b) by 154 days.

(21) Appl. No.: 13/958,659

(22) Filed: Aug. 5, 2013

(65) Prior Publication Data
US 2015/0039187 A1 Feb. 5, 2015

(51) Int. Cl.
| | |
|---|---|
| *E02F 9/20* | (2006.01) |
| *F02D 29/00* | (2006.01) |
| *F02D 41/08* | (2006.01) |
| *F02N 11/08* | (2006.01) |
| *E02F 9/22* | (2006.01) |
| *F02D 29/04* | (2006.01) |

(52) U.S. Cl.
CPC ........... *E02F 9/2246* (2013.01); *F02D 29/04* (2013.01); *F02N 11/0811* (2013.01); *F02N 11/0814* (2013.01); *F02N 11/0818* (2013.01); *F02N 11/0822* (2013.01); *E02F 9/2062* (2013.01); *F02D 2200/604* (2013.01); *F02N 2200/10* (2013.01); *Y02T 10/48* (2013.01)

(58) Field of Classification Search
None
See application file for complete search history.

(56) References Cited

U.S. PATENT DOCUMENTS

| | | | |
|---|---|---|---|
| 6,363,906 B1 * | 4/2002 | Thompson et al. | ... 123/198 DB |
| 6,371,889 B1 | 4/2002 | Kuroda et al. | |
| 6,694,240 B1 * | 2/2004 | Swick et al. | ..................... 701/50 |

(Continued)

FOREIGN PATENT DOCUMENTS

| | | | | |
|---|---|---|---|---|
| GB | 2424964 B | * | 5/2007 | ............. F02D 29/04 |
| JP | 2004300947 A | * | 10/2004 | ................ E02F 9/20 |
| WO | 2011/018340 A1 | | 2/2011 | |

OTHER PUBLICATIONS

Ikuhisa, JP 2004300947—written description, EPO Patent Translation May 14, 2016.*

(Continued)

*Primary Examiner* — Fadey Jabr
*Assistant Examiner* — Kevin P Mahne
(74) *Attorney, Agent, or Firm* — Kilpatrick Townsend & Stockton, LLP (57) ABSTRACT

The present disclosure provides a method of controlling a drive speed of a drive unit powering a work machine. The method includes determining if a control switch is in an enabled position and detecting if a control mechanism is moved within a defined period of time to operate the machine to perform a function. The method also includes detecting if a control means has been positioned in the active state once the control mechanism is not moved within the defined period of time. The method further includes sending a signal to a drive unit controller to shut off the drive unit when the control means is triggered to the active state. The drive unit is turned off as electrical energy continues to be provided from an energy storage device to at least the vehicle control unit, drive unit controller, and sensor after the drive unit is turned off.

11 Claims, 5 Drawing Sheets

(56) References Cited

U.S. PATENT DOCUMENTS

| | | | |
|---|---|---|---|
| 7,098,549 B2* | 8/2006 | Asakage et al. | 290/40 R |
| 7,702,450 B2* | 4/2010 | Pfohl et al. | 701/112 |
| 8,323,152 B2 | 12/2012 | Albrecht | |
| 8,326,520 B2 | 12/2012 | Bollig et al. | |
| 8,346,457 B2 | 1/2013 | Herbolzheimer | |
| 8,348,808 B2 | 1/2013 | Bollig et al. | |
| 8,452,523 B2 | 5/2013 | Nitz et al. | |
| 2005/0001606 A1* | 1/2005 | Kagoshima | 323/371 |
| 2005/0131622 A1 | 6/2005 | Braun et al. | |
| 2005/0150142 A1* | 7/2005 | Matsuda et al. | 37/414 |
| 2009/0043429 A1* | 2/2009 | Minekawa | 701/1 |
| 2010/0064677 A1* | 3/2010 | Kawaguchi et al. | 60/431 |
| 2010/0152995 A1 | 6/2010 | Baumann et al. | |
| 2010/0222991 A1 | 9/2010 | Berr | |
| 2011/0077828 A1* | 3/2011 | Matsuda et al. | 701/54 |
| 2012/0003069 A1* | 1/2012 | Hagiwara et al. | 414/685 |
| 2013/0174539 A1* | 7/2013 | Ezawa et al. | 60/431 |
| 2014/0008140 A1* | 1/2014 | Yoshida et al. | 180/309 |
| 2014/0303879 A1* | 10/2014 | Hyodo et al. | 701/112 |
| 2014/0350775 A1* | 11/2014 | Yagi et al. | 701/31.4 |
| 2015/0025753 A1* | 1/2015 | Mori et al. | 701/50 |
| 2015/0032314 A1* | 1/2015 | Kitamura | 701/22 |

OTHER PUBLICATIONS

Ikuhisa, JP 2004300947—biographic data, EPO Patent Translation May 14, 2016.*

"Mazda i-stop engine-idling-stop system wins another major award", New Atlas Automotive, < http://newatlas.com/mazda-i-stop-engine-idling-stop-systern-wins-Ichimura-industrial-award/14896/> (Accessed Aug. 12, 2016).

"Mazda3 iStop puts engine in pause mode", New Atlas Automotive < http://newatlas.com/mazda3-istop/12118/> (Accessed Aug. 12, 2016).

"Stop? Pause? A distinction without a difference with Mazda iStop", autoblog < http://www.autoblog.com/2009/07/03/stop-pause-a-distinction-without-a-difference-with-mazda-istop/> (Accessed Aug. 12, 2016).

* cited by examiner

SYSTEM AND METHOD FOR CONTROLLING A DRIVE UNIT OF A WORK MACHINE DURING AN IDLE STATE

FIELD OF THE DISCLOSURE

The present disclosure relates to a system for controlling output speed of a drive unit, and in particular to a system and method for controlling a drive unit of a work machine during an idle state.

BACKGROUND

For many in the construction and forestry industries, work efficiency, productivity, and safety are several of the considerations behind choosing what type of machine to purchase or use for a particular job. In addition to these considerations, many also have a desire to control rising fuel costs. As such, owners and operators of work machines in the construction and forestry industries are constantly evaluating ways to improve fuel savings. Some manufacturers in these industries have begun to introduce hybrid technology into their respective machines to achieve better costs, but with this being fairly new to construction and forestry equipment it is still unknown how effective these technologies will actually impact fuel costs. It is further unknown what effect these new technologies might have on machine performance and productivity.

Thus, there is still a need for new systems and technologies for controlling or reducing fuel costs without impacting the performance and productivity of the work machine.

SUMMARY

In one embodiment of the present disclosure, a method is provided for controlling a drive speed of a drive unit of a work machine. The method includes providing a vehicle control unit, a drive unit controller, a control mechanism, a sensor disposed in communication with the vehicle control unit, an energy storage device, a control switch, and a control means having an active state and an inactive state; determining if the control switch in an enabled position; detecting if the control mechanism is moved within a defined period of time to operate the machine to perform a function; detecting if the control means has been positioned in the active state once the control mechanism is not moved within the defined period of time; sending a signal to the drive unit controller to shut off the drive unit when the control means is triggered to the active state; turning off the drive unit; and providing electrical power from the energy storage device to at least the vehicle control unit, drive unit controller, and sensor after the drive unit is turned off.

In one example of this embodiment, the method can include initiating a time delay before the detecting if the control mechanism is moved. In a second example, the method can include detecting a hydraulic pilot pressure with the sensor in response to a movement or lack thereof of the control mechanism; communicating the hydraulic pilot pressure to the vehicle control unit; and determining if the hydraulic pressure is approximately the same as a defined stand-by pressure. In a third example, the method can include determining the control mechanism has not been moved within defined period of time when the hydraulic pressure is determined to be approximately the same as the defined stand-by pressure.

In a fourth example of this embodiment, the method can include receiving a current drive unit speed from the drive unit controller; comparing the current drive unit speed to a threshold speed; and detecting the position of the control means if the current drive speed is less than the threshold speed. In a fifth example, the method can include repeatedly detecting the position of the control means and control switch once the drive unit is turned off. In a sixth example, the method can include turning the drive unit on if the control means is positioned in the inactive state or the control switch is moved to a disabled position.

In a seventh example, the method can include generating a current or a change in current when the control mechanism is moved; detecting if a current or change in current is generated with the sensor; sending a second signal based on the detecting step to the vehicle control unit; and automatically sending the signal to the drive unit controller to shut off the drive unit regardless of the position of the control switch if the second signal is indicative that the control mechanism has not moved over the period of time. Moreover, in an eighth example, the method can include determining that the control mechanism has not moved within a second period of time; reducing drive unit speed from a first drive speed at which the machine is operating to an idle drive speed; and initiating a time delay after the drive unit speed has been reduced to the idle drive speed and before the determining if the control switch in an enabled position.

In another embodiment, a method is provided for shutting down a drive unit of a work machine. The method includes providing a vehicle control unit, a control mechanism for controlling the work machine, a sensor, an energy storage device, a control switch, and a control means; receiving a first signal from the sensor indicative of a movement of the control mechanism; determining based on the first signal whether the control mechanism has been moved over a first period of time; reducing a speed of the drive unit to an idle speed; receiving a second signal from the control switch indicative of a position of the control switch; determining if the control switch is positioned in an enabled position; determining based on the first signal whether the control mechanism has been moved over a second period of time; receiving a third signal from the control means indicative of a state of the control means; and shutting off the drive unit when the first signal indicates that the control mechanism has not moved over the second period of time, the second signal indicates that the control switch is in the enabled position, and the third signal indicates that the control means is in an active state.

In one example of this embodiment, the method can include providing electrical power from the energy storage device to at least the vehicle control unit, drive unit controller, and sensor after the drive unit is shut off. In a second example, the method can include continuously monitoring the first signal, the second signal, and the third signal after the drive unit is shut off; and restarting the drive unit if the vehicle control unit determines any one of the first signal is indicative that the control mechanism has been moved, the second signal is indicative that the control switch is in the disabled position, and the third signal is indicative that the control means is in an inactive state.

In a third example, the method can include generating a current or a change in current when the control mechanism is moved; determining a current or change in current is generated based on the first signal; and automatically shutting off the drive unit regardless of whether the third signal indicates that the control means is in the active state. In a fourth example, the method can include receiving a drive unit speed from a drive unit controller; comparing the drive unit speed to a threshold speed with the vehicle control unit;

and enabling the drive unit to be shut off when the drive unit speed is below the threshold speed.

In a different embodiment of the present disclosure, a machine includes a frame for supporting the machine; a ground-engaging mechanism positioned to support the frame; a drive unit coupled to the frame and a drive unit controller for controlling the drive unit; a cab coupled to the frame; a control system disposed in the cab, the control system including a control mechanism for controlling the operation of the machine and a control switch to enable a drive unit shutdown and restart process; a vehicle control unit disposed in electrical communication with the control mechanism and control switch; a sensor disposed in electrical communication with the vehicle control unit, the sensor configured to detect a movement of the control mechanism; and a control trigger disposed in electrical communication with the vehicle control unit, the control trigger adapted to communicate a signal to the vehicle control unit indicative of how long the drive unit is to be turned off; wherein, the vehicle control unit comprises a memory and a processor; further wherein, a set of instructions is stored in the memory of the vehicle control unit and executed by the processor to determine if the control switch is positioned in an enabled position, detect if the control mechanism is moved within a defined period of time, detect if the control trigger is positioned in an active state once the control mechanism has not moved within the defined period of time, and send a different signal to the drive unit controller to shut off the drive unit when the control trigger is positioned in the active state.

In one example of this embodiment, the machine can include a set of second instructions stored in the memory of the vehicle control unit and executed by the processor to send another signal to the drive unit controller to restart the drive unit if the vehicle control unit detects that the control switch is positioned in the disabled position, the control mechanism is moved, or the control trigger is positioned in an inactive state. In a second example, the machine can include a set of different instructions stored in the memory of the vehicle control unit and executed by the processor to determine that the control mechanism has not moved within a different period of time, compare a drive unit speed to a threshold speed, and reduce the drive unit speed to an idle drive unit speed.

In a third example, the machine can include an energy storage device electrically coupled to the vehicle control unit and the drive unit controller, wherein the energy storage device electrically powers the vehicle control unit and the drive unit controller after the drive unit is shut off. In a fourth example, the machine can include a display monitor positioned in the cab and electrically coupled to the vehicle control unit, the display monitor configured to visually indicate a current position of the control switch and a current state of the control trigger. In a fifth example, the control mechanism comprises at least a first control mechanism and a second control mechanism; and the sensor comprises at least a first sensor to detect a movement of the first control mechanism and a second sensor to detect a movement of the second control mechanism.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
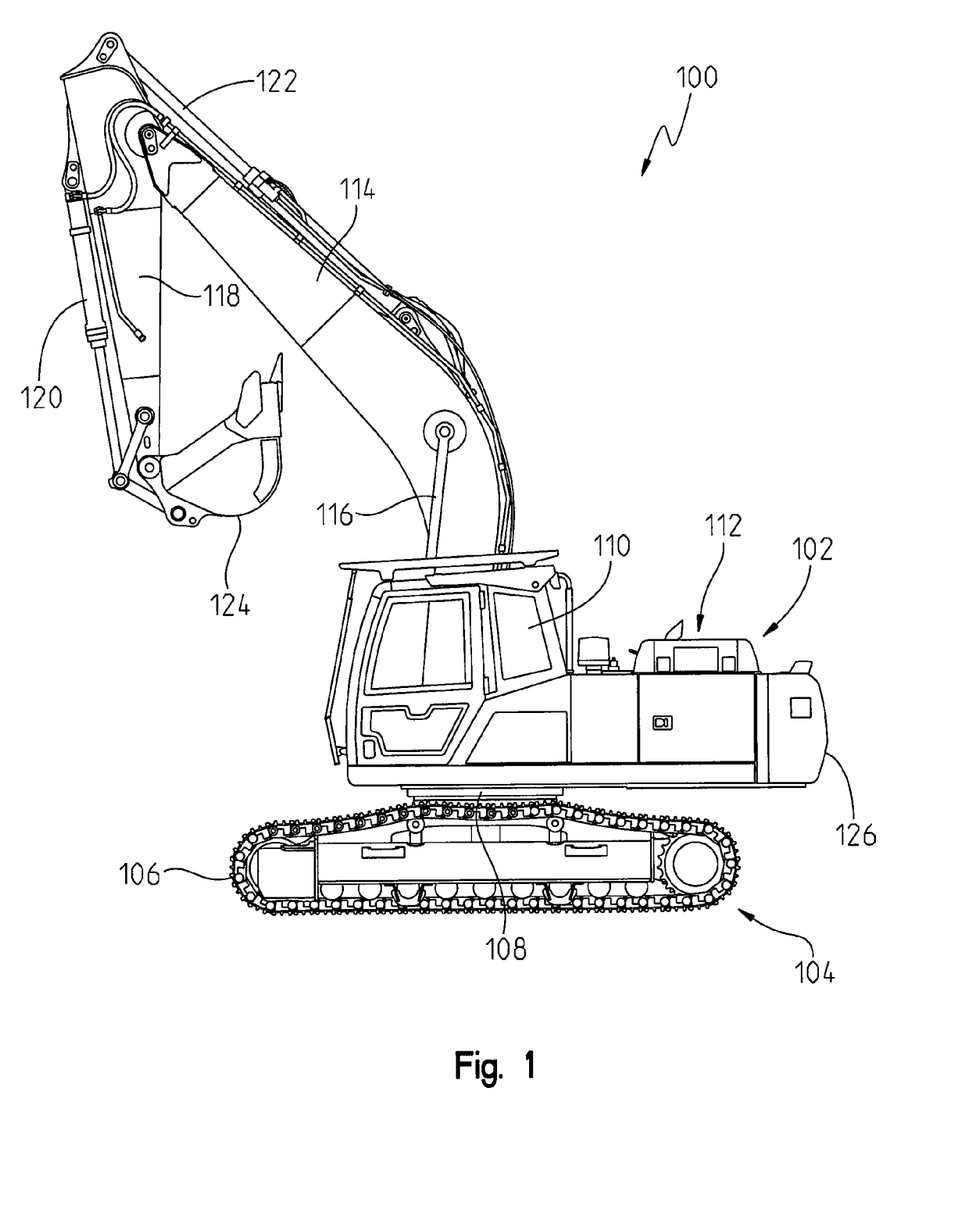
FIG. 1 is a side view of an excavator.

An exemplary embodiment of a work machine is shown in FIG. 1. The machine is embodied as an excavator 100. The present disclosure is not limited, however, to an excavator and may extend to other work machines that perform desired operations. As such, while the figures and forthcoming description may relate to an excavator, it is to be understood that the scope of the present disclosure extends beyond an excavator and, where applicable, the term "machine" or "work machine" will be used instead. The term "machine" or "work machine" is intended to be broader and encompass other vehicles besides an excavator for purposes of this disclosure.

Referring to FIG. 1, the excavator 100 includes an upper frame 102 pivotally mounted to an undercarriage 104. The upper frame 102 can be pivotally mounted on the undercarriage 104 by means of a swing pivot 108. The upper frame 102 is rotatable about 360° relative to the undercarriage 104 on the swing pivot 108. A hydraulic motor (not shown) can drive a gear train (not shown) for pivoting the upper frame 102 about the swing pivot 108.

The undercarriage 104 can include a pair of ground-engaging tracks 106 on opposite sides of the undercarriage 104 for moving along the ground. Alternatively, the excavator 100 can include wheels for engaging the ground. The upper frame 102 includes a cab 110 in which the machine operator controls the machine. The cab 110 can include a control system (not shown) including, but not limited to, a steering wheel, a control level, control pedals, or control buttons. The operator can actuate one or more controls of the control system for purposes of operating the excavator 100.

The excavator 100 also includes a large boom 114 that extends from the upper frame 102 adjacent to the cab 110. The boom 114 is rotatable about a vertical arc by actuation of a pair of boom cylinders 116. A dipper stick or arm 118 is rotatably mounted at one end of the boom 114 and its position is controlled by a hydraulic cylinder 122. The opposite end of the boom 114 is coupled to the upper frame 102. At the end opposite the boom 114, the dipper stick or arm 118 is mounted to an excavator bucket 124 that is pivotable relative to the arm 118 by means of a hydraulic cylinder 120.

The upper frame 102 of the excavator 100 includes an outer shell cover to protect an engine assembly 112. At an end opposite the cab 110, the upper frame 102 includes a counterweight body 126. The counterweight 126 comprises a housing filled with material to add weight to the machine and offset a load collected in the bucket 124. The offset weight can improve the digging performance of the excavator 100.

Excavators, like other work machines, are often used to perform a desired task at a job site with other machines. As a result, after a desired task is performed, the work machine may wait for a period of downtime before performing another task. This can often leave a machine operator spending a significant amount of time idling the machine until the next task. As the machine idles, it consumes fuel without performing any task. Although the machine is idling and not consuming as much fuel compared to when it is performing a task, the machine nevertheless wastes fuel as it idles. Thus, to better reduce fuel consumption during an idle condition or state, the present disclosure provides a system and method for reducing fuel consumption of a work machine during the idle condition or state.

Figure 2:
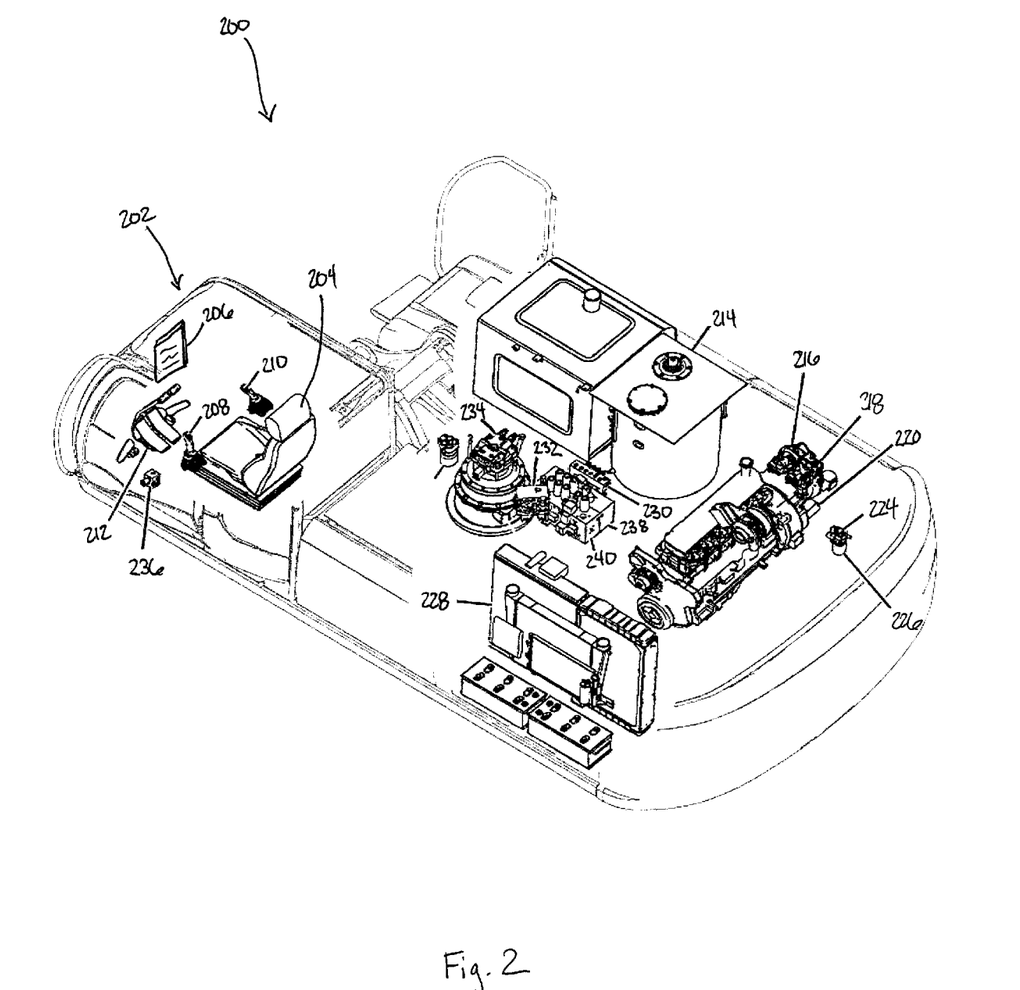
FIG. 2 is a partial side perspective view of a work machine having a system for controlling drive unit speed during an idle state.

Referring to FIG. 2, one example of a work machine 200 is provided that includes a system for reducing fuel consumption of a machine during the idle state. The machine 200 includes a cab portion 202 in which an operator's seat 204 is positioned. A machine operator can sit in the operator's seat 204 and control the machine 200 by manipulating a first control mechanism 208 and a second control mechanism 210. In the illustrated embodiment of FIG. 2, the first control mechanism 208 and second control mechanism 210 are shown as joysticks. These control mechanisms, however, can take any form including switches, knobs, steering wheels, levers, etc. Moreover, each control mechanism can include a switch, button, trigger, or other control device for controlling the machine. The cab portion 202 can also include a third control mechanism 212 in the form of one or more foot pedals 212. A dashboard or display monitor 206 can be positioned relative to the operator's seat 204 to allow the machine operator to visualize different characteristics of the machine such as speeds, temperatures, pressures, etc. Each of the first control mechanism 208, second control 210, and third control mechanism 212 can include an independent control valve that controls hydraulic pressure for operating the machine based on actuation of the respective control mechanism. Alternatively, the control valve can be shared amongst the different control mechanisms. In any event, actuation of each control mechanism can result in the control valve communicating with the hydraulic pump to control the machine. In one example, the hydraulic pump can be a variable displacement pump in which the control valve or another solenoid can be adjust the displacement of the pump based on operator control.

The machine 200 can include one or more hydraulic pumps for controlling the different functions of the machine, including controlling a boom, bucket, etc. of the machine. In the illustrated embodiment, for example, the machine 200 includes a first pump 216, a second pump 218, and a hydraulic pilot pump 220. The machine 200 can include a plurality of hydraulic control systems in which these pumps are used to provide hydraulic fluid to hydraulic actuators, valves, etc. A hydraulic oil tank 214 and oil cooler 228 can be incorporated into the different hydraulic control systems of the machine 200. The hydraulic oil tank 214 can provide a reservoir of hydraulic fluid to the plurality of control systems and the oil cooler 228 can be utilized to control the temperature of fluid passing through the plurality of control systems.

The plurality of hydraulic control systems of the machine 200 can include control valves, filters, and manifolds for controlling the hydraulic flow (e.g., flow rate, pressure, temperature, etc.). For instance, the machine 200 can include a pilot control circuit that includes a pilot pressure regulating valve 224, a pilot filter and bypass valve 226, a pilot signal manifold 232, and a pilot shutoff solenoid 236. The machine 200 can also include a solenoid valve manifold 230, a first control valve 238 and a second control valve 240. In one aspect, the pilot control circuit can form a high pressure, high flow hydraulic system that controls the functionality of the machine 200. Pressure sensors can be positioned throughout the pilot control circuit to detect the hydraulic pressure passing therethrough. The sensors can be disposed in electrical communication with a controller (e.g., vehicle control unit as described below) that can control the output of the hydraulic pumps. As also shown in FIG. 2, a swing device 234 can also form part of these control systems to control the pivotal motion of an upper frame relative to an undercarriage when the machine 200 comprises an excavator.

Figure 3:
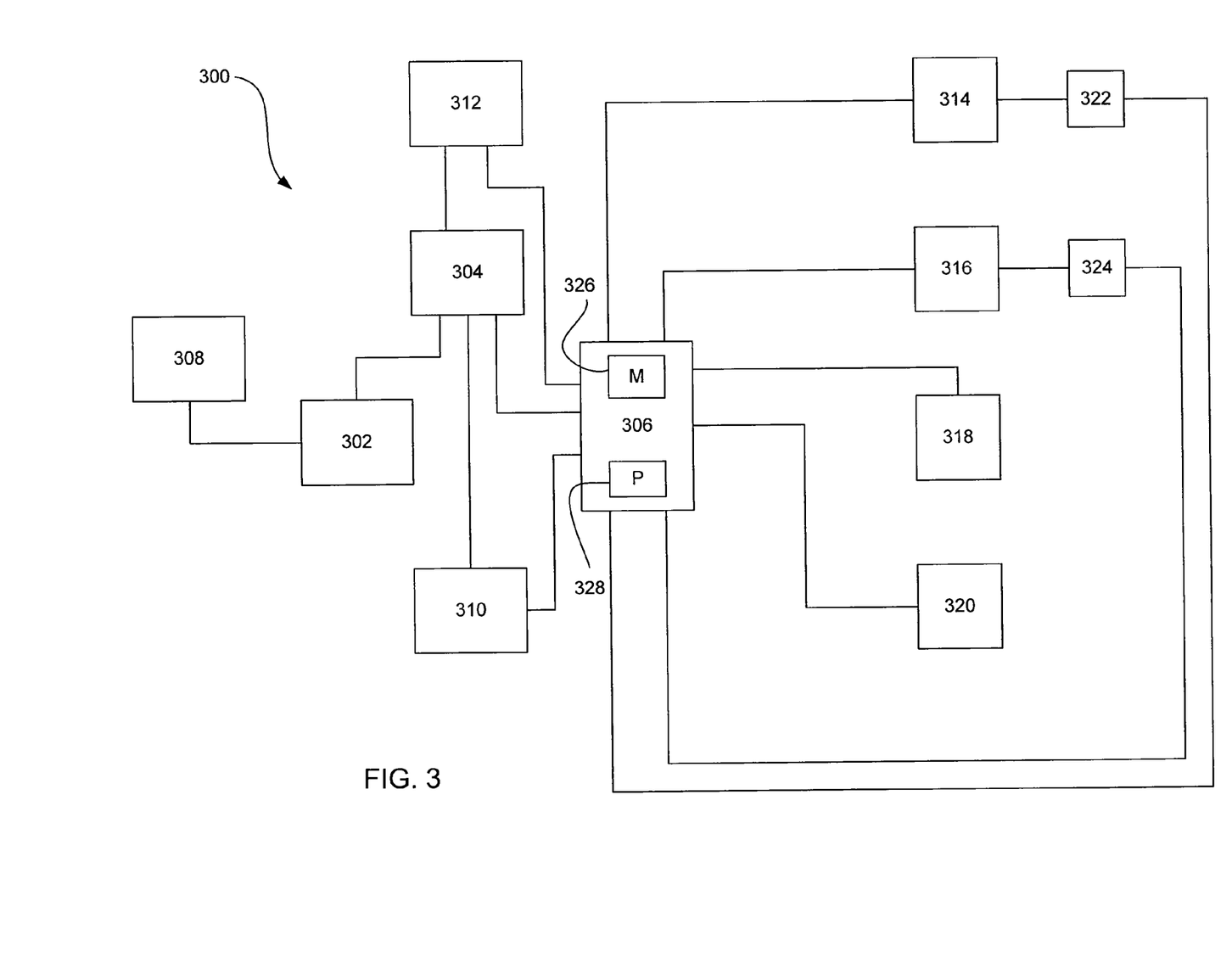
FIG. 3 is an exemplary control schematic of the work machine of FIG. 2.

The machine 200 can include a plurality of controllers for controlling the functionality of the machine 200. In FIG. 3, a control system of the machine 200 is shown. In the illustrated embodiment, the machine 200 can include a vehicle control unit (VCU) 306 for controlling the machine 200. The VCU 306 can have a plurality of inputs for receiving electrical signals and a plurality of outputs for submitting electrical signals. The VCU 306 can include a memory 326 and a processor 328 coupled to the memory 326. The processor 328 is configured to perform a set of instructions stored in the memory 326. The set of instructions can include different software programs, algorithms, logic, calculations, statistical analysis, or other methods and processes for carrying different functions of the machine.

The machine 200 can include a drive unit 302 as shown in the illustrated embodiment. The drive unit 302 can be in the form of an engine (e.g., similar to the engine assembly 112 of FIG. 1) or other power-generating device. The drive unit 302 can be controlled by a drive unit controller (DUC) 304. Similar to the VCU 306, the DUC 304 can include a memory and a processor coupled to the memory. The processor can perform different functions or sets of instructions stored in the memory. The DUC 304 can be coupled to the VCU 306 via a data link, communication link, communication bus, or other communication means. The communication link between the DUC 304 and VCU 306 can be hard-wired or wireless. The DUC 304 and VCU 306 can each receive electrical power from an energy storage device 310 such as a vehicle battery.

The drive unit 302 can drive a hydraulic pump 308 as shown in FIG. 3. The hydraulic pump 308 can take the form of any one of the first pump 216, second pump 218, and pilot pump 220. The hydraulic pump 308 can provide hydraulic fluid to drive the hydraulic actuators or cylinders that control a boom, dipper stick, bucket, or any other feature of the work machine 200. The aforementioned valves, solenoids, manifolds, etc. shown in the illustrated embodiment of FIG. 2 may be in fluid communication with the hydraulic pump 308 such that operator control can induce changes in fluid pressure from the hydraulic pump 308 to achieve desired performance from the machine 200.

The illustrated embodiment of FIG. 3 can further include a first control mechanism 314 and a second control mechanism 316. The first control mechanism 314 can be a lever, joystick, pedal, switch, knob, rotary dial, or other know control mechanism. In one aspect, the first control mechanism 314 can include one of the first control mechanism 208 and second control mechanism 210 of FIG. 2. The second control mechanism 316 can also include a lever, joystick, pedal, switch, knob, rotary dial, or other know control mechanism. In one aspect, the second control mechanism 316 can include the third control mechanism 212 shown in FIG. 2. The first control mechanism 314 and second control mechanism 316 can each include one or more controls, such as pedals, knobs, switches, levers, joysticks, etc. Therefore, while only two control mechanisms are shown in the illustrated embodiment of FIG. 3, each of the illustrated control mechanisms may represent one or more control mechanisms.

In one non-limiting example, the first control mechanism 314 can be manipulated by the machine operator's hand and the second control mechanism 316 can be manipulated by the machine operator's foot. In another example, one of the first control mechanism 314 and second control mechanism 316 can control the travel characteristics of the machine 200, e.g., direction, turning a corner, speed, etc. In a different example, one of the first control mechanism 314 and second control mechanism 316 can control the functionality and operation of a work implement, e.g., a bucket, blade, arms, cutting tool, boom, dipper stick, etc.

In any event, the first control mechanism 314 and second control mechanism 316 can be electrically coupled to the VCU 306. In the illustrated embodiment, a solid line is shown connecting the first control mechanism 314 and second control mechanism 316 to the VCU 306. For purposes of this disclosure, the solid lines shown in FIG. 3 can illustrate an electrical connection (e.g., wireless, hard-wired, etc.), a hydraulic connection (e.g., a fluid path coupling), a pneumatic connection, a mechanical connection, or any other connection between the different devices. These solid lines are only intended to illustrate a single example of how this embodiment may be structured, and other examples are contemplated by this disclosure.

The control system 300 of FIG. 3 can also include a plurality of sensors for detecting actuation of the first control mechanism 314 and second control mechanism 316. For example, a first sensor 322 can detect a movement or actuation of the first control mechanism 314 and a second sensor 324 can detect a movement or actuation of the second control mechanism 316. Each of the first sensor 322 and second sensor 324 can be disposed in electrical communication with the VCU 306 to send signals thereto when either control mechanism is moved or actuated by the machine operator. In this manner, a movement of either control mechanism can be communicated to the VCU 306, which in turn can communicate with a control valve (not shown) to control the hydraulic pump 308, similar to that described previously.

The control system 300 can also include two control systems for reducing fuel consumption of the machine 200. The first such system is an automated idle system that is controllable by software or a set of instructions stored in the memory 326 of the VCU 306. This automated idle system, or auto idle, can be enabled by the machine operator via a switch 318 or other control mechanism. The switch 318 can be located in the cab 202 of the machine 200 such that the operator can determine when to enable and disable this control feature. When the auto idle system is enabled or disabled, an icon or message can appear on a display monitor 312 in the machine 200 to alert the operator of this condition.

In one embodiment, the auto idle system can be enabled by triggering the switch 318 in the cab or elsewhere on the machine 200. Once the system is enabled, the VCU 306 can run an auto idle process under certain conditions. For instance, the VCU 306 can continuously monitor the first control mechanism 314 and second control mechanism 316 for movement or actuation by the operator. The sensors 322, 324 can detect movement of the control mechanisms and communicate such movement to the VCU 306. In one aspect, movement or actuation of the control mechanisms can be detected by a change in an electrical characteristic such as current or voltage. In another aspect, such movement or actuation can be detected by a change in hydraulic pressure in the hydraulic pilot system. Since the VCU 306 is continuously in communication with the sensors 322, 324, it is able to monitor operator control of the control mechanisms 314, 316.

As the VCU 306 monitors controlled movement of the control mechanisms, the auto idle process can be triggered once the VCU 306 identifies a lapse of time in which there is no movement or actuation of the control mechanisms. This lapse of time may be several seconds, e.g., 5-10 seconds. In other examples, the lapse of time may be between 5-30 seconds. Alternatively, the lapse of time can be between a few seconds (e.g., 2-3 seconds) to several minutes (1-5 minutes). Once the VCU 306 determines that the control mechanisms have not been moved for the predefined period of time, the VCU 306 can send a signal to the DUC 304 to request a reduction in speed of the drive unit 302. In one example, the drive unit speed can be reduced from a run speed to an idle speed. Thus, if the current run speed is 1800 RPM, the DUC 304 can reduce the speed to an idle speed of 1200 RPM, for example. The idle speed can be dependent on the type of drive unit 302 or engine. The run speed can depend on the current state and type of the machine 200 and drive unit 302. Thus, when the auto idle system is enabled and the VCU 306 is controlling the machine 200 according to the set of instructions defined by the auto idle process, the drive unit 302 is controlled such that it runs at a lower speed. In effect, this reduced idle speed can decrease fuel consumption and improve the fuel economy of the machine 200.

In some embodiments, the VCU 306 can monitor the length of time in which the machine 200 is operating in the auto idle system. If the VCU 306 determines that the machine 200 has idled for a defined length of time, logic or another process may be triggered which automatically shuts the machine 200 completely off. This type of logic or process may help control emissions or other environmental consideration. With the machine 200 shut down, the machine operator will have to restart the entire machine before it can return to a working condition.

In the illustrated embodiment of FIG. 3, the control system 300 can also include a second control system for reducing fuel consumption of the machine 200. This second system can be enabled by the machine operator via a second switch 320 disposed in the cab 202 or elsewhere on the machine 200. The second control system is a drive unit shutoff and restart system that is also controllable by software or a set of instructions stored in the memory 326 of the VCU 306. The state or condition of the shutdown/restart system, or SRS, can be identified to the machine operator via an icon or message that appears on the display monitor 312 in the machine 200.

The software or set of instructions stored in the memory 326 of the VCU 306 that controls the shutdown/restart system can be referred to as the SRS process ("shutdown restart system"). The SRS process can be performed by the VCU 306 either in collaboration with or independent from the auto idle process. In other words, the SRS process can be performed when the second switch 320 is enabled and the first switch 318 is enabled or disabled.

In one embodiment, the second switch 320 can include a separate control means in the form of a trigger, button, pedal or other known control device in which the machine operator actuates when the operator desires to activate the shutdown/restart system. In other words, the SRS process can be enabled by actuating the switch 320, but will only do so as long as the machine operator continuously triggers or applies the separate control means. The separate control means can be actuated by a foot pedal, a hand lever, or other manner. The separate control means therefore can have two states, namely, (1) an apply or active state and (2) an unapply or inactive state. In one example, the separate control means can be a button. As the operator depresses the button, the SRS process is activated. When the operator releases the button, the SRS process is deactivated. Thus, the operator can maintain control over when the SRS process is active or inactive. As will be described further, this operator control can also be automated on some machines.

Figure 5:
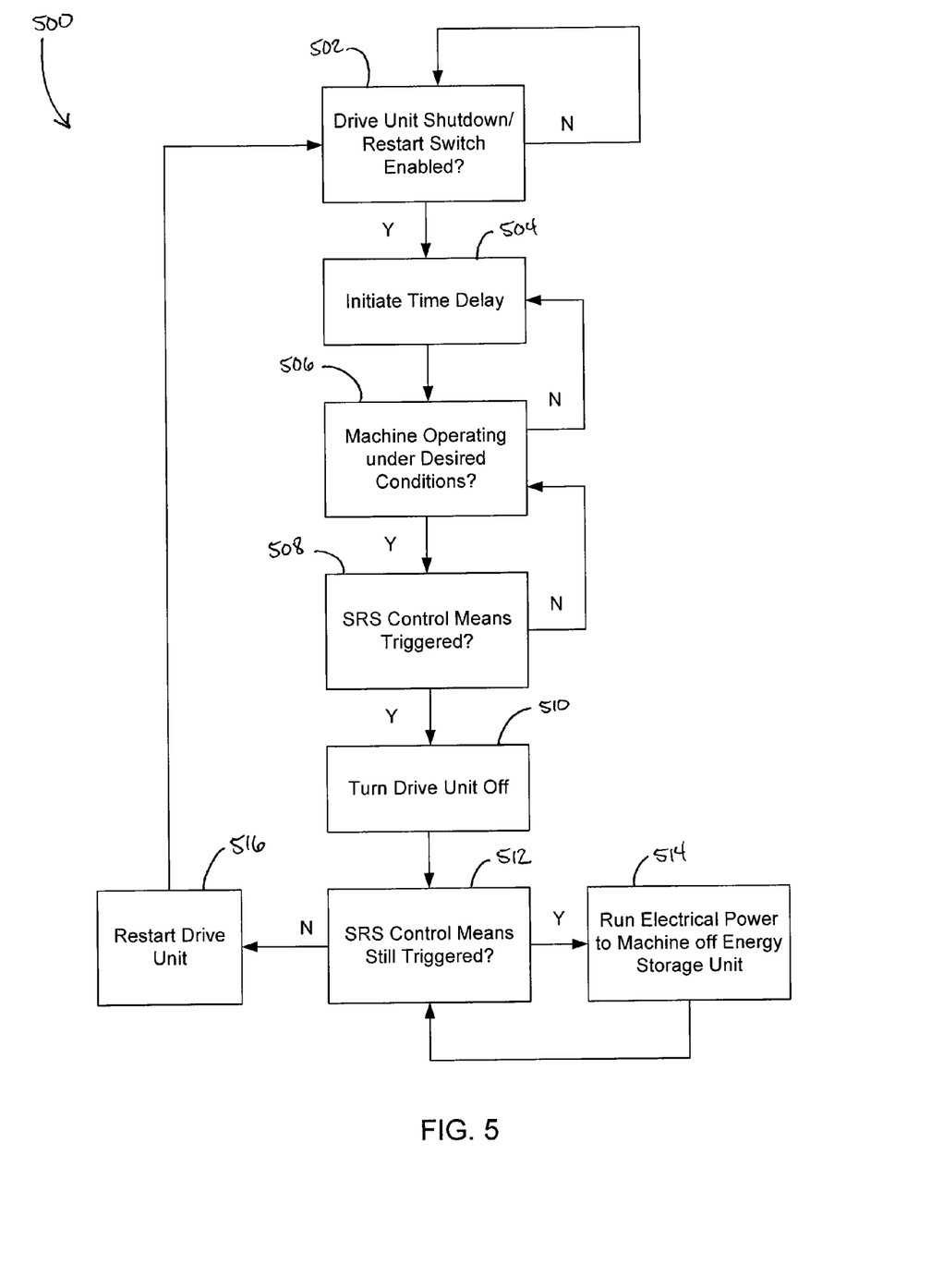
FIG. 5 is a control process for a drive unit shut down and restart system.

Referring to FIG. 5, one embodiment of the SRS process 500 is illustrated. The process 500 can include a series of steps that may not be shown in FIG. 5. Alternatively, in other embodiments, the process 500 may not perform every step shown in FIG. 5. Thus, FIG. 5 only is intended to represent one of a plurality of examples of the SRS process in this disclosure.

In block 502, the VCU 306 can determine whether the drive unit shut down and restart system is enabled. Here, the VCU can make this determination, for example, by receiving an electrical signal from the second switch 320 of the machine 200. Here, the machine operator can trigger this switch 320 to an active state to enable the system. If the switch 320 is in the inactive state, the VCU 306 may not take any further action until the switch 320 is triggered to the active state.

In block 504, the VCU 306 can initiate a time delay once the second switch 320 is enabled to the active state. The VCU 306 can include an internal timer which can be set to a desired time delay. The desired time delay can be defined in the set of instructions stored in the memory 326 of the VCU 306. The time delay can be between 3-15 seconds, for example. Alternatively, this delay can be set at any desired time to allow the drive unit 302 to reach desired conditions for enabling the shutdown/restart system.

In block 506, the VCU 306 can perform checks on the machine 200, and in particular the drive unit 302, to ensure turning off or shutting down the drive unit 302 will not raise any performance or safety concerns. For example, if the machine is performing a function, the VCU 306 may detect this condition and delay advancing to block 508 in the process 500.

In addition, the VCU 306 can constantly monitor the input signals received from the first sensor 322 and the second sensor 324. The SRS process 500 may only remain enabled so long as the sensors continuously detect a stand-by hydraulic pressure. For instance, if the operator is controlling one of the first control mechanism 314 and the second control mechanism 316, at least one of the first sensor 322 and second sensor 324 will measure a hydraulic pressure greater than stand-by pressure. However, if neither control mechanism is being manipulated, then the sensors will only detect stand-by pressure. In this example, the VCU 306 is continuously receiving the detected pressure from the sensors 322, 324 and comparing these detected pressures to the stand-by pressure. So long as the detected pressures are within a tolerance or range of the stand-by pressure, the VCU 306 can carry out the SRS process 500. If one of the sensors detects something other than stand-by pressure, then the VCU 306 can disable the SRS process 500 and return the machine to a normal operating condition or auto idle, whichever corresponds to the desired intent of the operator.

As another example of the conditions defined in block 506, the VCU 306 can receive drive unit speed from the DUC 304, and if the drive unit speed is below a certain threshold speed, the VCU 306 can determine in block 506 that the machine 200 is operating under desired conditions. In this example, the machine 200 may be operating in accordance with the auto idle system active. In this manner, the drive unit 302 is operating in an idle state at the time the VCU 306 is performing the SRS process 500. In a different example, however, the machine 200 does not have to be operating with the auto idle system active. In other words, the process 500 can be performed when the drive unit 302 is operating at different speeds, but the process 500 can include logic in block 506 in which the VCU 306 ensures the drive unit speed is at or below a threshold speed before advancing to block 508.

Other conditions that the VCU 306 can monitor in block 506 include whether the machine is performing a regeneration process in a diesel particulate filter (DPF), for example. The DPF can be positioned within an exhaust gas line of the machine to capture any soot or other material passing therethrough that exits from the exhaust. The VCU 306 or other controller can monitor the condition of the filter via a pressure drop across the inlet and outlet of the filter, an established period of time in which a regeneration process is triggered, or other criteria to determine when to regenerate the DPF and burn off any soot to maintain the filter life. The VCU 306 can include a set of instructions stored in its memory 326 in which the SRS process 500 does not advance to block 508 prior to or during a regeneration process. In one example, a sensor can detect an exhaust temperature or a time-based logic can be incorporated within the logic of the VCU 306 to detect the regeneration process.

Once the VCU 306 determines the conditions defined in block 508 are satisfied, the process 500 advances to block 508 in which the VCU 306 determines if the SRS control means is triggered. As described above, this can be a depressible button or pedal in which the operator controls. In the active state, the button can be depressed by the operator, and in the inactive state the button is not depressed. If the control means is in the inactive state, the process 500 can return to block 506 and repeat the same conditions defined therein. If the second switch 320 is triggered to the inactive or disabled state, the process 500 returns to block 502.

If, however, the control means is in the active state in block 508, the process 500 can advance to block 510 in which the VCU 306 communicates with the DUC 304 to turn off or shut down the drive unit 302. Although not shown, the process 500 can include a second time delay between blocks 508 and 510 in which the VCU 306 confirms that the operator desires to shut the drive unit 302 off, and that the triggering of the control means was not unintentional. This second time delay may be a relatively short time delay, e.g., 3 or less seconds.

Once the VCU 306 is ready to turn off the drive unit 302, a signal can be sent by the VCU 306 over a communication link to the DUC 304 which can shut down the drive unit 302. Once the drive unit 302 is turned off, the hydraulic pump 308 is no longer driven by the drive unit 302. Unless some other auxiliary power unit is able to power the hydraulic pump 308, the hydraulic system of which the hydraulic pump 308 is a part of loses fluid pressure so the machine 200 can no longer function as normal. While the drive unit 302 is turned off, however, the electrical system of the machine 200 can continue to operate off of the energy storage device 310. The energy storage device 310, which can include a vehicle battery, alternator, and the like, can provide electrical power to the machine 200 including the VCU 306, DUC 304, display monitor 312, and other devices that run off electrical power. Thus, unlike an emergency machine shutdown system or auto machine shutdown system, the SRS process 300 can allow the machine 200 to continue to function off electrical power from the energy storage device 310 even while the drive unit 302 is shut down.

Once the drive unit is turned off in block 510, the SRS process can repeatedly detect whether the operator has disabled or triggered the control means to the inactive state, thus indicating a desire to turn the drive unit back on. If the operator has triggered the control means to the inactive state, the SRS process can advance to block 516 and the VCU 306 communicates to the DUC 304 to restart the drive unit 302. Once the drive unit 302 is restarted in block 516, the SRS process 500 returns to block 502 and repeats the process.

If, in block 512, the VCU 306 detects that the operator has still triggered the SRS control means to the active state, the SRS control process 500 can advance to block 514 in which the drive unit 302 remains disabled but the electrical system of the machine 200 remains active. With the electrical system active, the machine 200 can quickly restart the drive unit 302 when necessary, but also reduce fuel consumption since the drive unit 302 is turned off. Unlike the auto idle system, the drive unit 302 is not idling at a reduced speed, and therefore greater fuel consumption savings can be gained. Moreover, unlike the auto shutdown system, the electrical system of the machine is still running off the energy storage unit 310, and therefore the VCU 306, DUC 304, and other controllers are still electrically powered. Thus, the operator does not have to reignite the drive unit 302 and electrical system of the machine 200 when the machine is completely shut down. Moreover, the SRS process 500 does not require the operator to activate the park brake, cycle controllers on and off, or reboot the electrical system, all of which can take significant time.

As previously described, while the operator depresses or triggers the control means, the SRS process 500 can remain running in block 514 while the VCU continuously checks the condition set forth in block 512 and block 502. In the event the second switch 320 is disabled by the operator, the VCU 306 can communicate to the DUC 304 to restart the drive unit 302 and the VCU 306 can control the machine under normal operating conditions or under the auto idle system.

In some embodiments, the VCU 306 can monitor the energy storage device 310 to ensure that the electrical power of the energy storage device 310 is not depleted during the SRS process 500. For example, the VCU 306 may be structured to detect voltage levels of the energy storage device 310, and if the voltage level falls below a predefined threshold, the VCU 306 may not enable the SRS process 500 until the voltage is above the predefined threshold. If the SRS process 500 is ongoing, the VCU 306 can deactivate the SRS process 500 and shut the entire machine down. Here, the operator may have to trigger a key switch, for example, to restart the machine.

In another embodiment, the shutdown/restart system can be an automated system in which the VCU 306 can include a set of instructions stored in its memory 326 for determining when to enable this system and operate the machine 200 according to the SRS process 500. This may be particularly true for an electrohydraulic machine in which the first sensor 322 and second sensor 324 measure a current output by the first control mechanism 314 and second control mechanism 316, respectively. In this manner, any movement or manipulation of the first control mechanism 314 or the second control mechanism 316 would induce a change in current or generate a current that is detectable by the sensors 322, 324. If the sensors 322, 324 do not detect a current or change in current, i.e., neither control mechanism is being moved, over a period of time, the VCU 306 can be configured to automatically activate and control the machine according to the SRS process 500.

Figure 4:
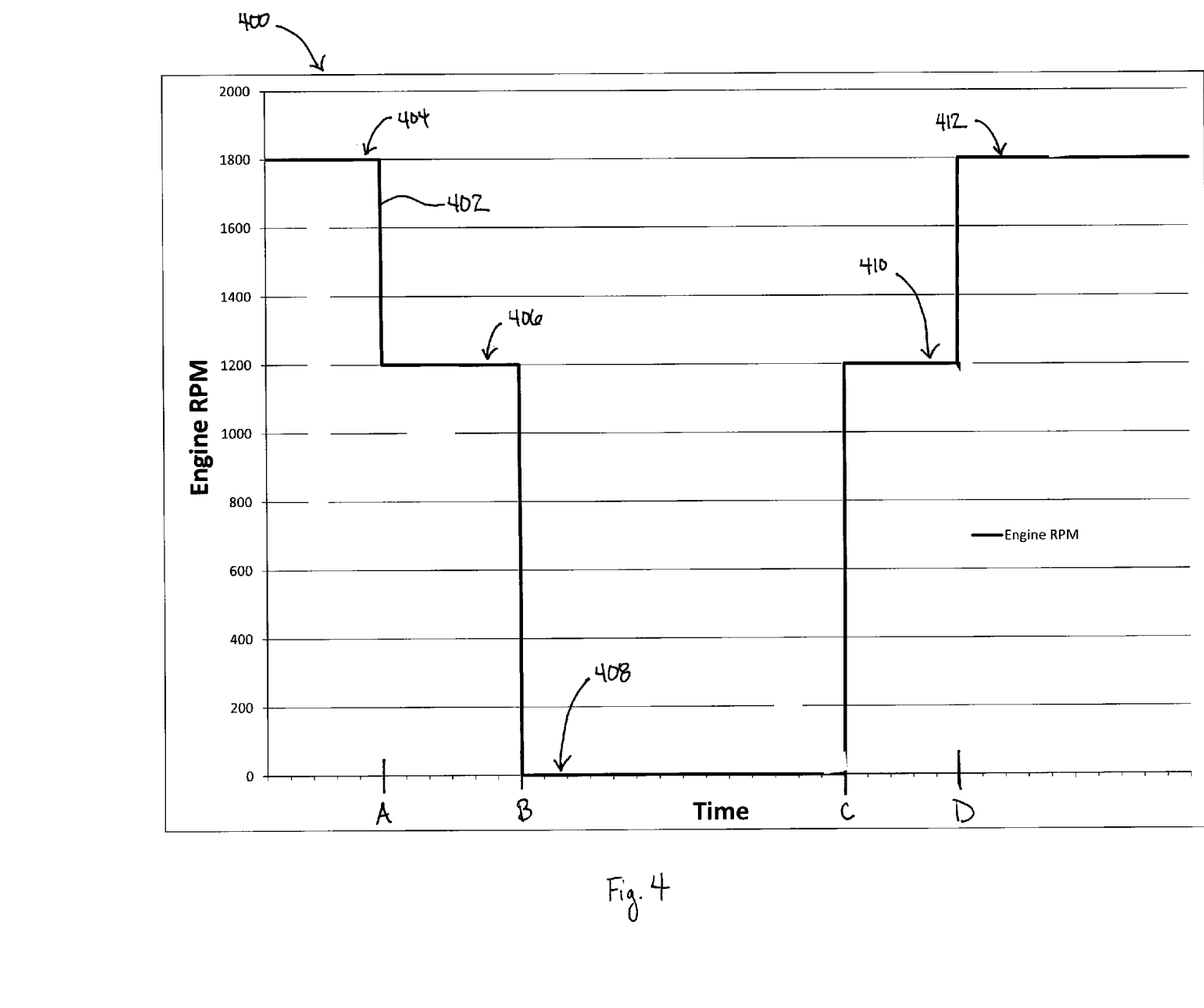
FIG. 4 is a graphical view of drive unit speed of the work machine of FIG. 2 over a period of time.

A further, non-limiting example of the SRS process 500 is shown in FIG. 4. A graphical illustration 400 is provided which shows how the drive speed of the drive unit 302 (illustrated as an engine) can be controlled over a period of time. In FIG. 4, the period of time is broken down into specific moments in time and labelled as time A, time B, time C, and time D. The graphical illustration 400 further shows a curve 402 representative of drive unit speed over the period of time.

In FIG. 4, a first drive state 404 is shown. Here, the drive unit 302 is running at a drive speed of approximately 1800 RPM. In this first drive state 404, the drive unit speed 402 is shown as remaining substantially constant. The drive unit speed 402 can decrease if the first control mechanism 314 and second control mechanism 316 are not being moved. Nevertheless, at time A, the VCU 306 detects that neither control mechanism has been moved over a period of time such that VCU 306 enables the auto idle system. In this example, it is presumed that the operator has triggered the first switch 318 to the state so that the VCU 306 can carry out the auto idle process. Thus, at time A, the VCU 306 can communicate to the DUC 304 to reduce drive unit speed 402 to an idle state 406. In the idle state 406, the drive unit speed 402 is shown to be approximately 1200 RPM. This again is not intended to be limiting and is only representative of one type of drive unit 304.

Once the drive unit 302 is brought to the idle state 406, the VCU 306 can determine whether the second switch 320 is enabled to the active state. Alternatively, in an electrohydraulic machine, the VCU 306 may automatically enable the SRS process 500 if no current is detected from the control mechanisms. In any event, during the idle state 406 the VCU 306 can run the SRS process 500 and at time B the process 500 advances to block 510 where the drive unit 302 is turned off. At this point in time, the machine 200 is now configured in the shutdown state where the drive unit 302 is shutdown but the electrical system of the machine 200 is still providing power to the various controllers of the machine 200. Therefore, any movement of the first control mechanism 314 or second control mechanism 316 can cause the SRS process 500 to advance to block 516 in which the drive unit 302 is restarted.

In addition, if the operator releases the control means and this is detected by the VCU 306 in block 512, the SRS process 500 advances to block 516 and the drive unit 302 is restarted. The control means again can be a switch or button that is controlled by the operator. In the form of a button, the operator can depress the button when the operator desires to shut the drive unit off and can releases the button when the operator desires to restart the engine. This button or switch can be in the cab and placed on either the first control mechanism 314 or second control mechanism 316. Alternatively, the button or switch can be a foot pedal that is separate from either control mechanism. It is further possible that the control means is a lever or joystick in which the operator moves in a direction to trigger the SRS process 500 to shutdown the drive unit 302, and then movement in a different direction can trigger the SRS process to restart the drive unit 302. These are examples of how the control means can be structured and control the SRS process 500, but those skilled in the art may appreciate other control means besides switches, buttons, pedals, levers, and joysticks that can be used to advance the SRS process 500 to block 510. Moreover, in an automated system such as in an electrohydraulic machine, the lack of movement of either control mechanism may be sufficient for the SRS process 500 to advance to block 510 and turn off the drive unit 302. Any of these examples, or combinations thereof, are contemplated within the scope of this disclosure.

In FIG. 4, the drive unit 302 remains in the shutdown state 408 until time C. At this moment, one of the conditions described above (e.g., movement of a control mechanism, release of control means, movement of the second switch 320 to the disabled position, etc.) occurs and the SRS process 500 advances to block 516 in which the drive unit 302 is turned back on. In this illustrative embodiment, the drive unit 302 returns to the auto idle state 410 and remains in this condition until one of the control mechanisms is moved at time D causing the drive unit speed 402 to increase to a drive state 412. Although the drive states 404, 412 are shown to be at about the same speed, i.e., 1800 RPM, this is only intended to be an example.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A machine, comprising:
a frame for supporting the machine;
a ground-engaging mechanism positioned to support the frame;
a drive unit coupled to the frame and a drive unit controller for controlling the drive unit;
a cab coupled to the frame;
a control system disposed in the cab, the control system including a control mechanism for controlling the operation of the machine and a control switch to enable a drive unit shutdown and restart (SRS) process;
a vehicle control unit disposed in electrical communication with the control mechanism and control switch;
a sensor disposed in electrical communication with the vehicle control unit, the sensor configured to detect a movement of the control mechanism; and
a SRS control device disposed in electrical communication with the vehicle control unit, the SRS control device comprising a depressible button adapted to be physically manipulated and to communicate a signal to the vehicle control unit indicative of a state of the depressible button;
wherein the vehicle control unit comprises a processor and a memory in which instructions executable by the processor are stored for causing the processor to:
determine that the control switch is positioned in an enabled position,
in response to determining that the control switch is positioned in the enabled position, detect that the control mechanism has been stationary for a defined period of time,
in response to detecting that the control mechanism has been stationary for the defined period of time, determine that the machine is operating under a predetermined condition,
in response to determining that the machine is operating under the predetermined condition, detect that the SRS control device is depressed,
in response to detecting that the SRS control device is depressed, send a shutdown signal to the drive unit controller that is configured to cause the drive unit controller to shut off the drive unit in response to the shutdown signal; and
subsequent to sending the shutdown signal and in response to detecting that the SRS control device is in an undepressed state, send a restart signal to the drive unit controller that is configured to cause the drive unit controller to restart the drive unit in response to the restart signal.

2. The machine of claim 1, wherein the memory stores a second set of instructions executable by the processor for causing the processor to:
send another signal to the drive unit controller configured to restart the drive unit in response to the vehicle control unit detecting that the control mechanism was moved.

3. The machine of claim 1, wherein the memory comprises a different set of instructions executable by the processor for causing the processor to:
determine that the control mechanism has not moved within a different period of time, compare a drive unit speed to a threshold speed, and reduce the drive unit speed to an idle drive unit speed.

4. The machine of claim 1, further comprising an energy storage device electrically coupled to the vehicle control unit and the drive unit controller, wherein the energy storage device is configured to electrically power the vehicle control unit and the drive unit controller after the drive unit is shut off and in response to the SRS control device being depressed.

5. The machine of claim 1, further comprising a display monitor positioned in the cab and electrically coupled to the vehicle control unit, the display monitor configured to visually indicate a current position of the control switch and a current state of the SRS control device.

6. The machine of claim 1, wherein:
the control mechanism comprises at least a first control mechanism and a second control mechanism; and
the sensor comprises at least a first sensor configured to detect a movement of the first control mechanism and a second sensor configured to detect a movement of the second control mechanism.

7. The machine of claim 1, wherein the memory further comprises instructions executable by the processor for causing the processor to determine that the machine is operating under the predetermined condition by:

determining that an amount of hydraulic pressure changeable in response to a manipulation of the control mechanism is within a defined tolerance range of a standby hydraulic pressure.

8. The machine of claim 1, wherein the memory further comprises instructions executable by the processor for causing the processor to determine that the machine is operating under the predetermined condition by:
    determining that a drive unit speed of the drive unit is below a threshold.

9. The machine of claim 1, wherein the memory further comprises instructions executable by the processor for causing the processor to determine that the machine is operating under the predetermined condition by:
    determining that the machine is not performing a regeneration process for a diesel particulate filter based on a pressure across an inlet and an outlet of the diesel particulate filer.

10. The machine of claim 1, wherein the memory further comprises instructions executable by the processor for causing the processor to:
    send another signal to the drive unit controller configured to restart the drive unit in response to the vehicle control unit detecting that the control switch is positioned in the disabled position.

11. The machine of claim 1, wherein the memory further comprises instructions executable by the processor for causing the processor to determine that the machine is operating under the predetermined condition by:
    determining that the machine is not performing a work function.

* * * * *